(12) United States Patent
Binzel et al.

(10) Patent No.: US 8,582,530 B2
(45) Date of Patent: Nov. 12, 2013

(54) EXPEDITED REPORTING OF NEIGHBOR CELL SIGNAL STRENGTH

(75) Inventors: Charles P. Binzel, Bristol, WI (US); Daniel C. Chisu, Franklin Park, IL (US); William K. Morgan, Wauconda, IL (US)

(73) Assignee: Intel Corporation, Santa Clara, CA (US)

( * ) Notice: Subject to any disclaimer, the term of this patent is extended or adjusted under 35 U.S.C. 154(b) by 320 days.

(21) Appl. No.: 12/981,743

(22) Filed: Dec. 30, 2010

(65) Prior Publication Data

US 2012/0170546 A1    Jul. 5, 2012

(51) Int. Cl.
*H04W 4/00*    (2009.01)

(52) U.S. Cl.
USPC .......................................................... 370/331

(58) Field of Classification Search
USPC .......... 370/241, 252, 310, 328, 329, 331, 332, 370/333; 455/403, 422.1, 436, 437, 438, 455/442
See application file for complete search history.

(56) References Cited

U.S. PATENT DOCUMENTS

| | | | | |
|---|---|---|---|---|
| 5,966,657 | A * | 10/1999 | Sporre | 455/425 |
| 2003/0087647 | A1 * | 5/2003 | Hurst | 455/456 |
| 2006/0281463 | A1 * | 12/2006 | Yang | 455/442 |
| 2007/0264996 | A1 * | 11/2007 | Vikberg | 455/426.1 |
| 2011/0319028 | A1 * | 12/2011 | Magadi Rangaiah et al. | 455/67.11 |

FOREIGN PATENT DOCUMENTS

WO    2007023156 A1    3/2007

OTHER PUBLICATIONS

"3rd Generation Partnership Project; 1-18 Technical Specification Group GSM/EDGE Radio Access Network; Mobile radio interface layer 3 specification; Radio Resource Control (RRC) protocol (Release10)", 3GPP Standard; 3GPP.TS 44.018, 3rd Generation Partnership Project (3GPP), Mobile Competence Centre; 650, Route Des Lucioles; F-06921 Sophia-Anti Polis Cedex , France, No. V10.1.0, Dec. 20, 2010 (Dec. 28, 2010), pp. 1-429.

"3rd Generation Partnership Project; Technical Specification Group GSM/EDGE Radio Access Network; Radio subsystem link control (Release 7)", 3GPP Standard; 3GPP TS 45.008. 3rd Generation Partnership Project (3GPP). Mobile Competence Centre; 650. Route Des Lucioles; F-06921 Sophia-Antipolis Cedex; France, No. V7.19.0. Dec. 21, 2010 pp. 1-120.

Patent Cooperation Treaty, International Search Report and Written Opinion of the International Searching Authority for International Application No. PCT/US201/066547, Mar. 27, 2012, 14 pages.

* cited by examiner

*Primary Examiner* — Obaidul Huq
(74) *Attorney, Agent, or Firm* — Schwabe, Williamson & Wyatt, P.C.

(57) ABSTRACT

A wireless mobile device/station (MS) sends measurement reports of neighbor cells to a serving base transmitter station (BTS). The MS receives information messages transmitted by the BTS at a signaling period, while the MS is in a first cell. The MS is configured to receive a first information message and a subsequent second information message following a handoff. When both information messages are received, the MS transmits a measurement report to the base station, based on contents of the current, received information messages. Responsive to the MS failing to receive/detect the second information message, the MS transmits a measurement report to the BTS based on (a) a current/first information message(s) and (b) a previous information message of the same type as the undetected second information message. The BTS initiates another handoff based on the information in the second type of measurement report.

16 Claims, 7 Drawing Sheets

| PARAMETER NAME | DESCRIPTION | RANGE | BITS | CHANNEL |
|---|---|---|---|---|
| BSIC | BASE STATION IDENTIFICATION CODE | 0-63 | 6 | SCH D/L |
| BA | BCCH ALLOCATION | – | – | BCCH D/L |
| BA_IND | SEQUENCE NUMBER OF BA | 0/1 | 1 | BCCH D/L SACCH D/L |
| 3G_BA_IND | SEQUENCE NUMBER OF 3G NEIGHBOR CELL LIST | 0/1 | 1 | BCCH D/L SACCH D/L |
| ... | ... | ... | ... | ... |
| NCC_PERMITTED | BIT MAP OF NCCs FOR WHICH THE MS IS PERMITTED TO REPORT MEASUREMENT RESULTS. BIT MAP RELATES TO NCC PART OF BSIC. | – | 8 | BCCH D/L SACCH D/L |
| ... | ... | ... | ... | ... |

EXPEDITED REPORTING OF NEIGHBOR CELL SIGNAL STRENGTH

BACKGROUND

1. Technical Field

The present invention generally relates to wireless communication systems and in particular to measurement and reporting of neighbor cell signal strength in wireless communication systems.

2. Description of the Related Art

In dedicated mode and group transmit mode, a slow associated control channel (SACCH) signal is used in the signalling layer at least for measurement results for transmission from the mobile station. The SACCH is uniquely configured such that continuous transmission occurs in both directions, at least on the channel carrying the main signalling link. For that purpose, in uplink transmissions, a mobile station (i.e., a wireless device) sends measurement result messages towards the base transceiver station (BTS) (i.e., the network direction) at each possible occasion, when no other (higher priority data) has to be sent. Similarly, System Information messages are sent from the BTS to the mobile station (MS) via unnumbered information (UI) frames when no other (higher priority data) has to be sent.

Problems occurring in the reception of SACCH frames are interpreted as a loss of communication means and appropriate procedures are then triggered as specified in 3GPP TS 45.008 (i.e., according to established SACCH procedures). Some of these communication problems occur during the handoff process. Occasionally, a mobile station on a first base station is handed off to a second base station from which the mobile station detects a weak signal. As a result, the MS must wait for a broadcast message before sending out a report on the neighbor list, which is used to spawn another handoff. If the waiting period is too long, the MS (phone) call "dies" before the overhead broadcast message is received. Conventional approaches to these problems do not effectively resolve the issue of dropped calls caused by delays associated with the receipt of broadcast information messages.

BRIEF DESCRIPTION OF THE DRAWINGS

The embodiments described herein and advantages thereof, will best be understood by reference to the following detailed description of illustrative embodiments when read in conjunction with the accompanying drawings, wherein.

DETAILED DESCRIPTION OF AN ILLUSTRATIVE EMBODIMENT

The illustrative embodiments provide a method, system, and wireless device for efficiently sending signal strength reports of neighbor cells from the wireless device to the base station. A neighbor cell reporting (NCR) utility of the wireless device receives information messages transmitted by a base transmitter station (BTS) at a pre-configured signaling period to the wireless device, while the wireless device is in a first cell. The wireless device transmits a first type of measurement report to the base station, according to contents of the current, received information messages. A Base Handover utility at the BTS initiates a handoff of the wireless device to a second cell, based on the measurement report. The wireless device successfully receives a first information message and is configured to also receive a subsequent second information message. Responsive to the wireless device failing to receive/detect (in a timely manner) a second information message within the second cell, the NCR utility transmits a second type of measurement report from the wireless device based on (a) a current/first information message(s) and (b) a previous information message of the same type as the undetected second information message. The Base Handover utility initiates another handoff according to (and based on) the information in the second type of measurement report, in order to avoid a dropped call and/or degraded service at the wireless device.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

Within the descriptions of the figures, similar elements are provided similar names and reference numerals as those of the previous figure(s). Where a later figure utilizes the element in a different context or with different functionality, the element is provided a different leading numeral representative of the figure number (e.g, 1xx for FIGS. 1 and 2xx for FIG. 2). The specific numerals assigned to the elements are provided solely to aid in the description and not meant to imply any limitations (structural or functional) on the invention.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

Figure 1:
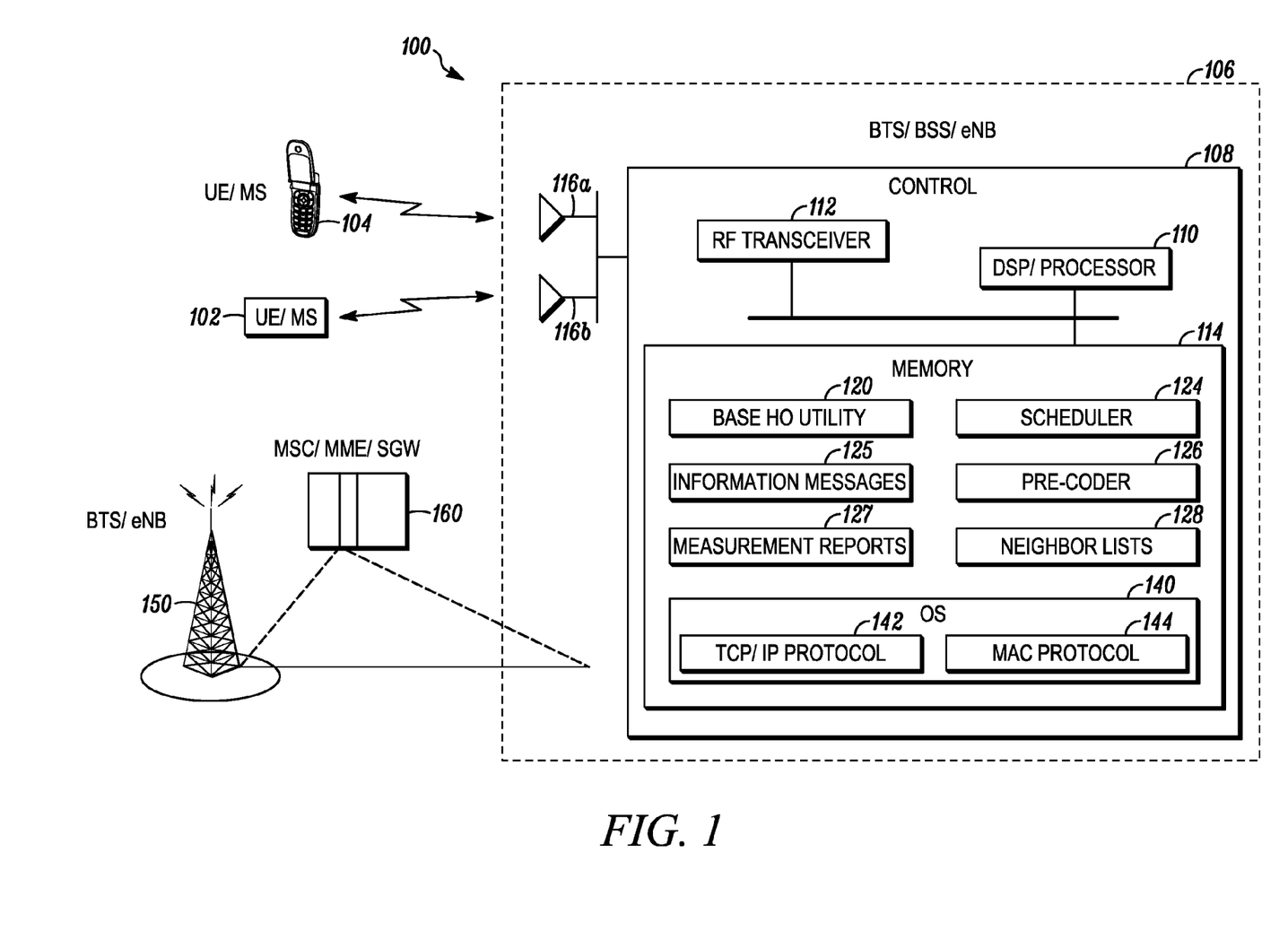
FIG. 1 illustrates a wireless communication system including a block diagram representation of a wireless device and a base transceiver station (BTS), according to one embodiment.

With reference now to FIG. 1, a wireless communication system (WCS) is illustrated. In one embodiment, WCS 100 is a Long Term Evolution (LTE) configured system. In another embodiment, WCS 100 represents a Second Generation (2G) Global System for Mobile Communications (GSM) system.

In the described embodiments, wireless communication system 100 may support several standards/networks, such as third generation (3G) and fourth generation (4G) networks, which include Long Term Evolution (LTE) standard.

Wireless communication system 100 comprises a number ("L") of wireless communication devices, for example, first and second wireless devices, mobile station (MS)/user equipment (UE) 102 and MS/UE 104. One or more of the wireless communication devices may be associated with a mobile user/subscriber. Thus, in certain instances, a wireless communication device may be interchangeably referred to herein as a user device, user equipment (UE), mobile user device, mobile station (MS), subscriber or user, as a general reference to the association of the device(s) to a device user. These references are however not intended to be limiting on the applicability of the invention to devices not directly associated with individual/human users. Within the description which follows, the example wireless device is primarily referred to as MS/UE 102 or simply MS 102.

Wireless communication system 100 comprises at least one base transceiver station (BTS)/Evolved Universal Terrestrial Radio Access Network Node B (eNodeB/eNB) 106, illustrated with its various functional components in block diagram representation. In one embodiment, BTS/eNB 106 may represent a base station sub-system (BSS), an enhanced/evolved node B (eNB), or a base station. BTS/eNB 106 comprises (base station) controller (Cntl) 108. Controller 108 comprises memory 114, digital signal processor (DSP)/Processor 110 and RF transceiver 112. Although the logic of RF transceiver 112 is illustrated within controller 108, it should be appreciated that with other implementations, RF transceiver 112 may likely be positioned external to controller 108. Also, while shown as a single module/device, DSP/Processor 110 may be one or more individual components communicatively coupled to each other, and controlling different functions within Cntl 108. Furthermore, BSS 106 may be shown as two distinct components, a base transceiver and a base station controller, in other implementations. In these implementations, the BSC may shared by several BTSs. The wireless communication devices all connect to BTS/eNodeB 106 via an antenna array comprising one or more antenna elements, of which BTS antenna 116 is illustrated. Wireless communication system 100 is further illustrated with second BTS/BSS 150.

In addition to the above described hardware components of BSS/eNodeB 106 within wireless communication system 100, various features of the invention may be completed/supported via software (or firmware) code or logic stored within memory 114 (or other storage) and executed by DSP/Processor 110. Thus, for example, illustrated within memory 114 are a number of software/firmware/logic components/modules, including operating system (OS) 140 which includes Transmission Control Protocol (TCP)/Internet Protocol (IP) module 142 and Media Access Control (MAC) protocol module 144. Memory 114 also includes scheduler 124, precoder 126, information messages 125, measurement reports 127, and neighbor lists 128. In addition, memory 114 comprises Base Handover logic/utility 120. In actual implementation, Base Handover logic 120 may be combined with one or more of the other components/modules to provide a single executable component, collectively providing the various functions of each individual component when the corresponding combined utility is executed by processing components of BTS/eNodeB 106. In the descriptions which follow, Base Handover utility 120 is illustrated and described as a stand-alone or separate software/firmware component, which provides specific functions, as described below.

During wireless communication, MS/UE 102 and MS/UE 104 wirelessly communicates with BTS/BSS 106 via the antenna array. MS/UE 102 provides signal strength information for neighbor cells defined by the received power of respective BTSs, via measurement reports 127, to BTS/BSS 106 (i.e., the serving cell). MS/UE 102 provides these measurement reports in response to receipt of one or more information messages from BTS 106 which messages instruct MS/UE 102 about the type of information requested and which neighbor cells to report on. BTS 106 communicates (via a broadcast control channel (BCCH)) general information about the network, the serving cell and adjacent cells to MS/UE 102. As presented herein, measurement reports 127 can be one of a type 1 measurement report (generated using only currently received/current SI5 and SI6 information) or a type 2 measurement report (generated using current SI5 information and previously-received SI6 information), and both types are interchangeably referenced as measurement report 127.

Figure 2:
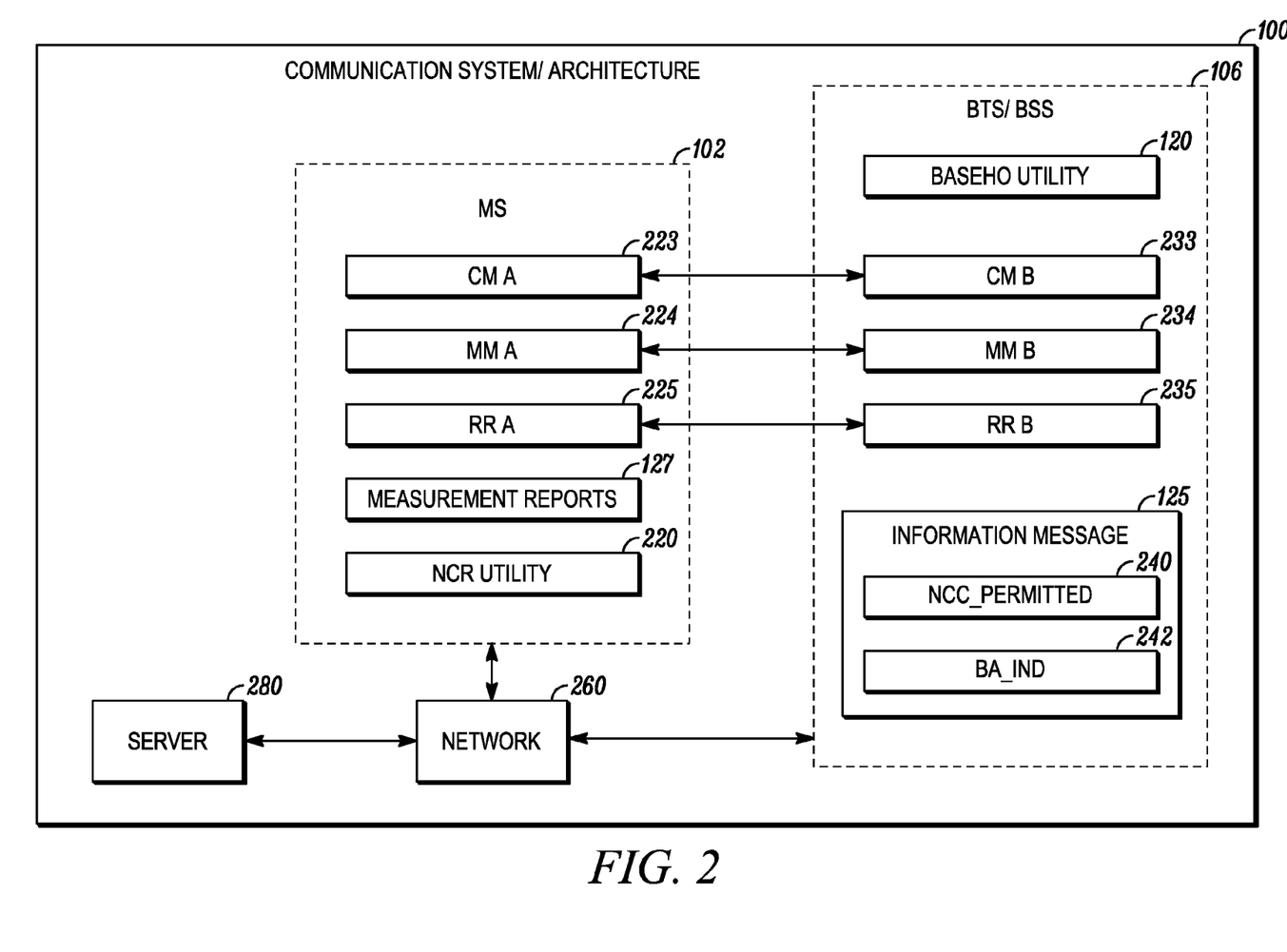
FIG. 2 provides a block diagram representation of a communication architecture for communication between mobile station (MS) and base transceiver station (BTS), according to one embodiment.

With reference now to FIG. 2, there is depicted a block diagram representation of a communication architecture for communication between user equipment (MS) and Base Station Sub-System (BSS). As illustrated, communication architecture 100 comprises MS/UE 102 and BSS/BTS 106. MS/UE 102 comprises radio resource management (protocol stack) (RR) A 225, mobility management (MM) A 224 and connection management (CM) A 223. MS/UE 102 also include measurements reports 127 and NCR utility 220. In communication with MS/UE 102 is eNodeB 106. Included within eNodeB 106 are: neighbor cell reporting (NCR) logic/utility 120, resource management (protocol stack) (RR) B 235, mobility management (MM) B 234 and connection management (CM) B 233. BTS 106 also includes information message(s) 125. Information message(s) 125 provides values for a number of control parameters of which NCC_Permitted parameter 240 and BA_IND parameter 242 are illustrated. Additionally, communication system/architecture 100 includes network 260 and server 280.

Those of ordinary skill in the art will appreciate that the hardware components and basic configuration depicted in FIG. 1 and FIG. 2 may vary. The illustrative components within wireless communication system/architecture 100, MS/UE 102 and BSS/eNodeB 106 are not intended to be exhaustive, but rather are representative to highlight essential components that are utilized to implement the present invention. For example, other devices/components may be used in addition to or in place of the hardware depicted. The depicted example is not meant to imply architectural or other limitations with respect to the presently described embodiments and/or the general invention.

In 2G GSM, a dedicated transmit mode or a group transmit mode may be utilized to communicate messages associated with reporting (cell) performance measurements to a BTS/BSS 106. BTS 106 uses the slow associated control channel (SACCH) in the signalling layer to send messages to MS/UE 102 instruct MS/UE 102 about the type of cell performance (i.e., signal strength) measurements to perform. The SACCH is uniquely configured such that continuous transmission occurs in both directions, at least on the channel carrying the main signalling link. For that purpose, in uplink transmissions, a mobile station (i.e., a wireless device) sends signal strength measurements towards the BTS (i.e., the network direction) at each possible occasion, when no other (higher priority data) has to be sent. Similarly, system information messages (e.g., System Information Type 5, 6 and optionally 5bis and 5ter messages) are sent from BTS 106 to the MS/UE 102 via unnumbered information (UI) frames when no other (higher priority data) has to be sent.

In one embodiment, Base HO utility 120 executing on BTS/BSS 106 transmits measurement information messages on the SACCH to instruct MS/UE 102 to use the enhanced measurement report. In a multi-slot configuration, the System Information Type 5, 6 and optionally 5bis, 5ter, and measurement information messages are sent on the SACCH associated with the channel carrying the main signalling link. Thus, in the multi-slot configuration, the mobile station ignores all messages received on the SACCH(s) that are not associated with the channel carrying the main signalling link.

A mobile station 102 with extended measurement capabilities and which receives extended measurement order (EMO) messages on the SACCH performs and reports extended measurements. The System Information Type 5bis message is sent to MS/UE 102 if the EXT IND bit in the Neighbour Cell Description information element (IE) in both the SI5 and SI5bis messages indicates that each information element only carries part of the BA.

In wireless communication system (WCS) 100 (and/or specifically within MS/UE 102), neighbor cell reporting (NCR) utility 120 configures the wireless device to provide, at a preset reporting period, a first type of measurement report of measurement results, according to contents of one or more information messages. NCR utility 220 (or generally MS/UE 102) provides reports using neighbor lists that comprise one or more of: (a) a BCCH Allocation (BA) list; (b) a 3G Neighbour Cell List; and (c) a Neighbour Cell List corresponding to the enhanced measurement report message. A BCCH allocation list or BA list is a list of frequencies (of the BCCH carriers) supported on the neighboring cells. BTS 106 sends the BA list on the BCCH (Broadcast Control Channel) in a SI2 message. However, the BA list is also sent on the SACCH in a SI5 message. The BA list is the "neighbor list" comprising the neighbors that can be "seen"/detected from some point in the cell. NCR utility 220 reports to the BSC the neighbors with which synchronization can be established and from which neighbors a clear/strong signal is detectable at the location of MS/UE 102 in the cell.

One or more instances of an information message may provide BSIC information. This is used to build the relevant Neighbour list, according to pre-established procedures. The GSM Neighbour Cell list may contain up to 96 Neighbour Cells. The base station identification code (BSIC) is used to differentiate between cells so that frequencies can be reused. Specifically, BSICs are used to identify the cell using a specific frequency in the BA list.

Figure 3:
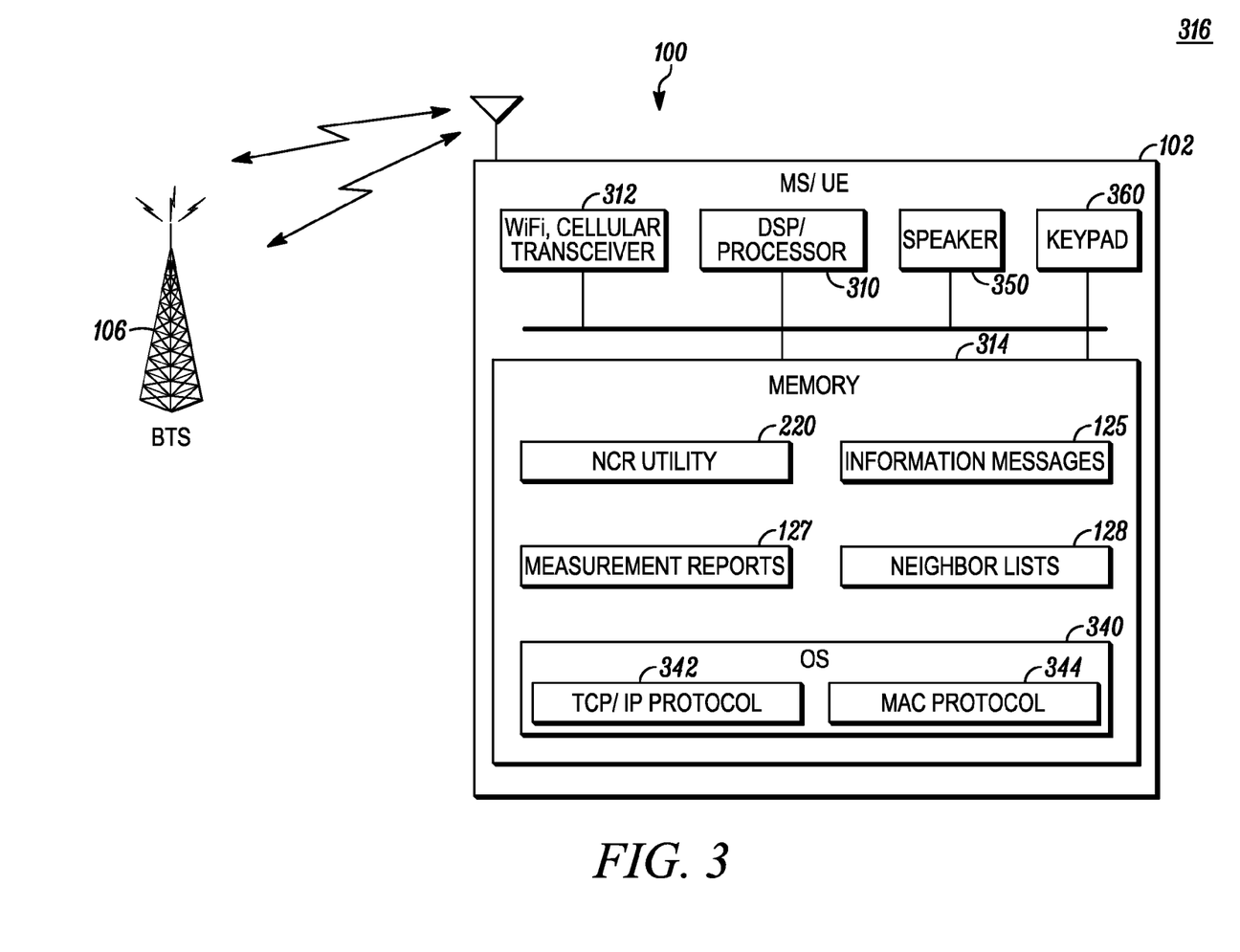
FIG. 3 illustrates a block diagram representation of an example wireless communication device within which aspects of the described embodiments can be implement, according to one or more embodiments.

FIG. 3 illustrates basic functional components of an example wireless communications device (or MS) within a wireless communications system, according to one embodiment. In one embodiment, the wireless communications device is a mobile cellular device/phone (e.g., MS/UE 102). MS/UE 102 comprises memory 314, digital signal processor (DSP)/Processor 310 and RF transceiver 312. MS/UE 102 connects to BTS/eNodeB 106 via an antenna illustrated as antenna 316. In addition, MS/UE 102 comprises speaker 350, microphone 352 and keypad 360 for user level interaction with the device.

In addition to the above described hardware components of MS/UE 102, various features of the invention may be completed/supported via software (or firmware) code or logic stored within memory 314 (or other storage) and executed by DSP/Processor 310. Thus, for example, illustrated within memory 314 are a number of software/firmware/logic components/modules, including mobile operating system (OS) 340 which includes Transmission Control Protocol (TCP)/Internet Protocol (IP) module 342 and Media Access Control (MAC) protocol module 344. Memory 314 also includes information messages 125, measurement reports 127, and neighbor lists 128. In addition, memory 314 comprises neighbor cell reporting (NCR) logic/utility 220.

In actual implementation, NCR logic 220 may be combined with one or more of the other components/modules to provide a single executable component, collectively providing the various functions of each individual component when the corresponding combined utility is executed by processing components of MS/UE 102. In the descriptions herein, NCR utility 220 is illustrated and described as a stand-alone or separate software/firmware component, which provides specific functions, as described below. In the described embodiment, NCR utility 220 provides certain functions that are executed by components within MS/UE 102. Additional detail of the functionality associated with NCR utility 220 is presented below with reference to FIG. 4 and other figures.

Certain of the functions supported and/or provided by NCR utility/logic 220 are implemented via processing logic (or code) executed by a wireless device processor and/or other device hardware. Among the software code/instructions/logic provided by NCR utility 220, and which are specific to the described embodiment, are: (a) logic for receiving at a wireless device one or more information messages at a configured signaling period; (b) logic for transmitting from the wireless device a first type of measurement report according to contents of the one or more information messages; (c) logic for responding to a request for a handoff of the wireless device to a second cell according to one or more measurement reports; (d) logic for successfully receiving within the second cell a first information message; (e) logic for detecting that the wireless device fails to receive a second information message; and (f) logic for transmitting a second type of measurement report from the wireless device based on (i) a current/first information message(s) and (ii) a previous information message of the same type as the undetected second information message; and (g) logic for responding to another request for a handoff that avoids a dropped call for the wireless device, according the information in the second type of measurement report. According to the illustrative embodiment, when processor 310 or wireless device processor executes NCR utility 220, MS/UE 102 initiates a series of functional processes that enable the above functional features as well as additional features/functionality. These features/functionalities are described in further detail below within the (continuing description of FIGS. 1-3 and) description of FIGS. 4-6.

In the described embodiment, Base HO utility 120 uses measurement reports to determine whether to initiate a handoff of MS/UE 102 to a second cell. NCR utility 220 enables MS/UE 102 to provide a second/alternative type of measurement report in response to a failure of MS/UE 102 to receive one or more of the expected information messages. Following a handoff of MS/UE 102 to the second cell, MS/UE 102 may initially fail to detect a clear signal from BTS 106. However, NCR utility 220 avoids a call drop issue based on transmission of the second type of measurement report from MS/UE 102. In particular, if an expected system information message is not received by MS/UE 102 in a timely manner (i.e., within a preset interval following a corresponding preset signaling period), MS/UE 102/NCR utility 220 transmits the second type of measurement report. The second type of measurement report includes a previously received type of information message that is the same type as the information message that MS/UE 102 fails to receive. NCR utility 220 enables MS/UE 102 to provide a (rebuilt/modified/updated) neighbor list with the measurement report, according to the appropriate (SACCH) procedures. As utilized herein, the term "second type of measurement report" refers to a measurement report which includes information from an information message sent while the MS/UE 102 was in a previous cell (i.e., before the handoff to the current cell). Consequently, the term "second type of measurement report" is used herein only to distinguish this measurement report from another measurement report which is referred to herein as a "first type of measurement report". The "first type of measurement report" uses information from an information message received from within a current cell and does not include information from an information message transmitted while the MS/UE 102 was in a previous cell. Although, these measurement reports use the same structure/format and are not distinguishable from the perspective of the BS/eNodeB, these reports differ in the way they are generated in that one report (i.e., the first type of measurement report) uses only current cell system information messages to create/generate the measurement report, and the other (second type) report uses current cell system information messages and previous cell system information messages to compile/create a measurement report. More specifically, the first type of measurement report may be described herein as a measurement report that is created using (a) a current SI5 message and (b) a current SI6 message(s) from a current cell instead of a previously transmitted SI6 message (s) (from a previous cell). Similarly, the second type of measurement report may be described herein as a measurement report that is created using (a) a current SI5 message and (b) a previous SI6 message(s) instead of a currently transmitted SI6 message(s), since the currently transmitted SI6 message was not (yet) received by MS/UE 102.

Figure 4A:
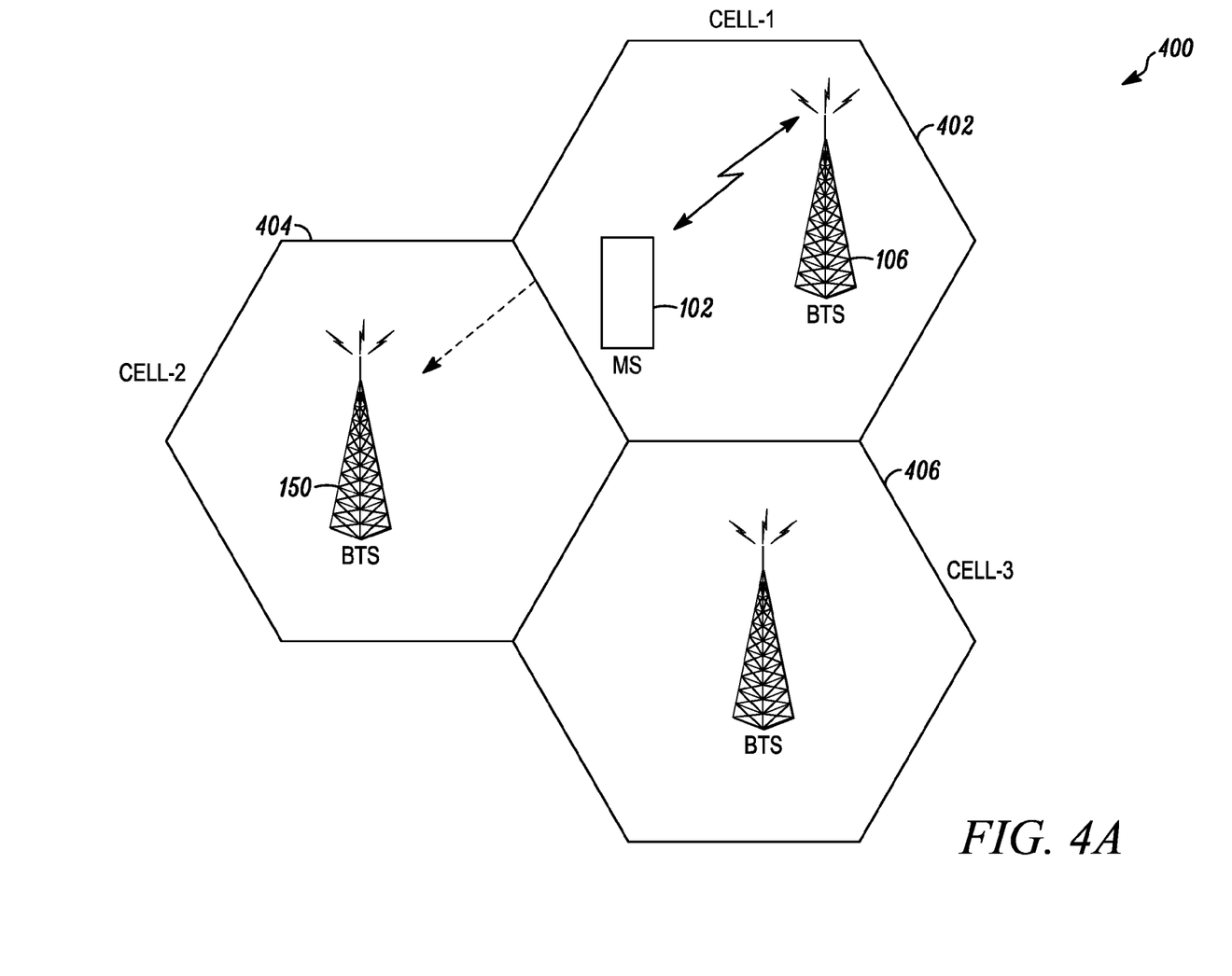
FIG. 4A illustrates a mobile station/subscriber within a first cell prior to moving to a second/neighbor cell, according to one embodiment.

FIG. 4A illustrates a mobile station/subscriber within a first cell prior to moving to a second/neighbor cell, according to one embodiment. Cell Network 400 comprises Cell-1 (first cell) 402, Cell-2 (second cell) 404 and Cell-3 406. Illustrated within Cell-1 402 are MS 102 and BTS 106. BTS 150 is located within Cell-2 404.

In Cell Network 400, MS 102 is currently located within first cell 402 (i.e., a first serving cell) and approaches neighbor/second cell 404. Base Handover utility 120/BTS 106 transmits one or more information messages 125 at a configured signaling period to MS/UE 102. Following successful receipt of information messages 125, NCR utility 220/MS 102 transmits a first type of measurement report 127 to the base station, according to contents of information messages 125. Base Handover utility 120/BTS 106 determines whether to initiate a handoff of MS/UE 102 to one of the neighbor cells (e.g., Cell-1 402), according to measurement report received. For example, Base Handover utility 120 may initiate a handoff to neighbor cell if the measurement report indicates that MS/UE 102 detects a stronger signal from neighbor cell than the first serving cell or any other neighbor cell, according to the measurement report(s).

Figure 4B:
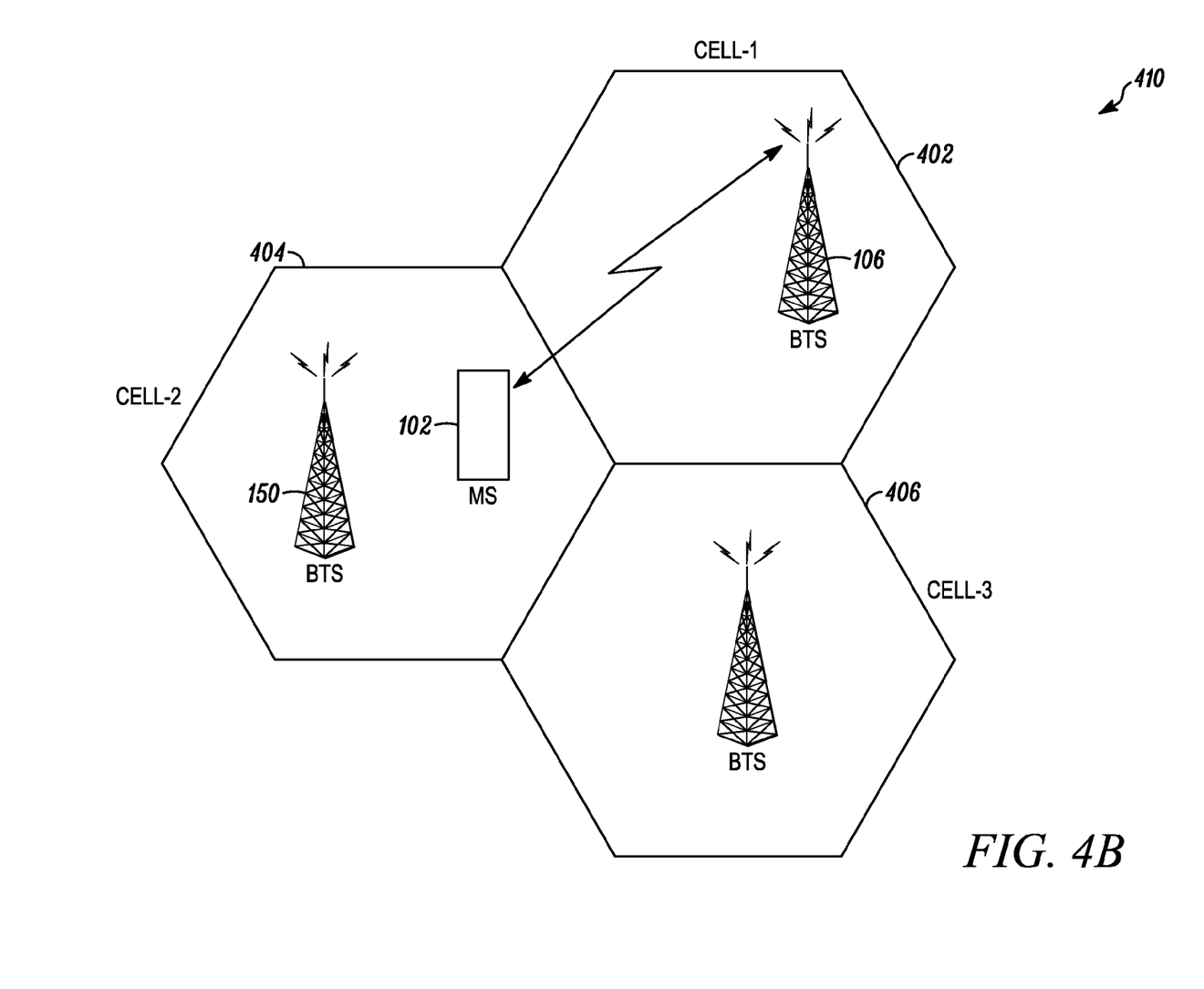
FIG. 4B illustrates a mobile station/subscriber within a second cell after moving from a first cell to the second/neighbor cell, according to one embodiment.

FIG. 4B illustrates a mobile station/subscriber with a second cell after moving from a first cell to the second/neighbor cell, according to one embodiment. Cell Network 410 comprises Cell-1 (first cell) 402, Cell-2 (second cell) 404 and Cell-3 406. BTS 106 is located within Cell-1 402. Illustrated within Cell-2 404 are MS/UE 102 and BTS 150.

In Cell Network 410, Base Handover utility 120 initiates a handoff of MS/UE 102 as MS/UE 102 moves into second cell 404 (i.e., a current serving cell) from a first serving cell. Base Handover utility 120/BTS 106 transmits one or more information messages at a configured signaling period to MS/UE 102. NCR utility 220 detects successful receipt by MS/UE 102 of a first type of information message within the current serving cell. However, NCR utility 220 recognizes that MS/UE 102 fails to receive a second information message (e.g., NCC_Permitted via an SI6 message). NCR utility 220 transmits a second type of measurement report, instead of a first type of measurement report, from MS/UE 102 in response to a failure of MS/UE 102 to receive the second information message at a preset interval following a corresponding preset signaling period.

In GSM, when channel conditions are marginal, every second counts when reporting neighbors to the network for a potential handover. When handed over to a new cell, MS/UE 102 collects one or both of SI5 and SI6 messages on the SACCH prior to sending a valid neighbor performance report to the network. Each SACCH message takes approximately 480 ms to receive and BTS/BSS 106 cycles through (transmission of) the set of (system) information messages. The minimum set of information messages that are transmitted comprises one SI5 message and one Sys6 message. However, there may be additional messages which include SI5bis and/or SI5ter. In marginal conditions, one or more of these information messages may be missed by MS/UE 102 due to decode errors. However, instead of waiting until the information messages(s) are received, MS/UE 102 sends a second type of measurement report 127 that uses (a) a current information message (e.g., SI5) but also (b) a neighbor list and/or control parameters from previously received information message (e.g., SI6) that is of a same type as the information message that MS/UE 102 currently fails to receive. NCR utility 220 avoids delaying the transmission of a neighbor measurement report from MS 102, based on a preset configuration that instructs MS/UE 102 to provide the second type of measurement report.

Figure 5:
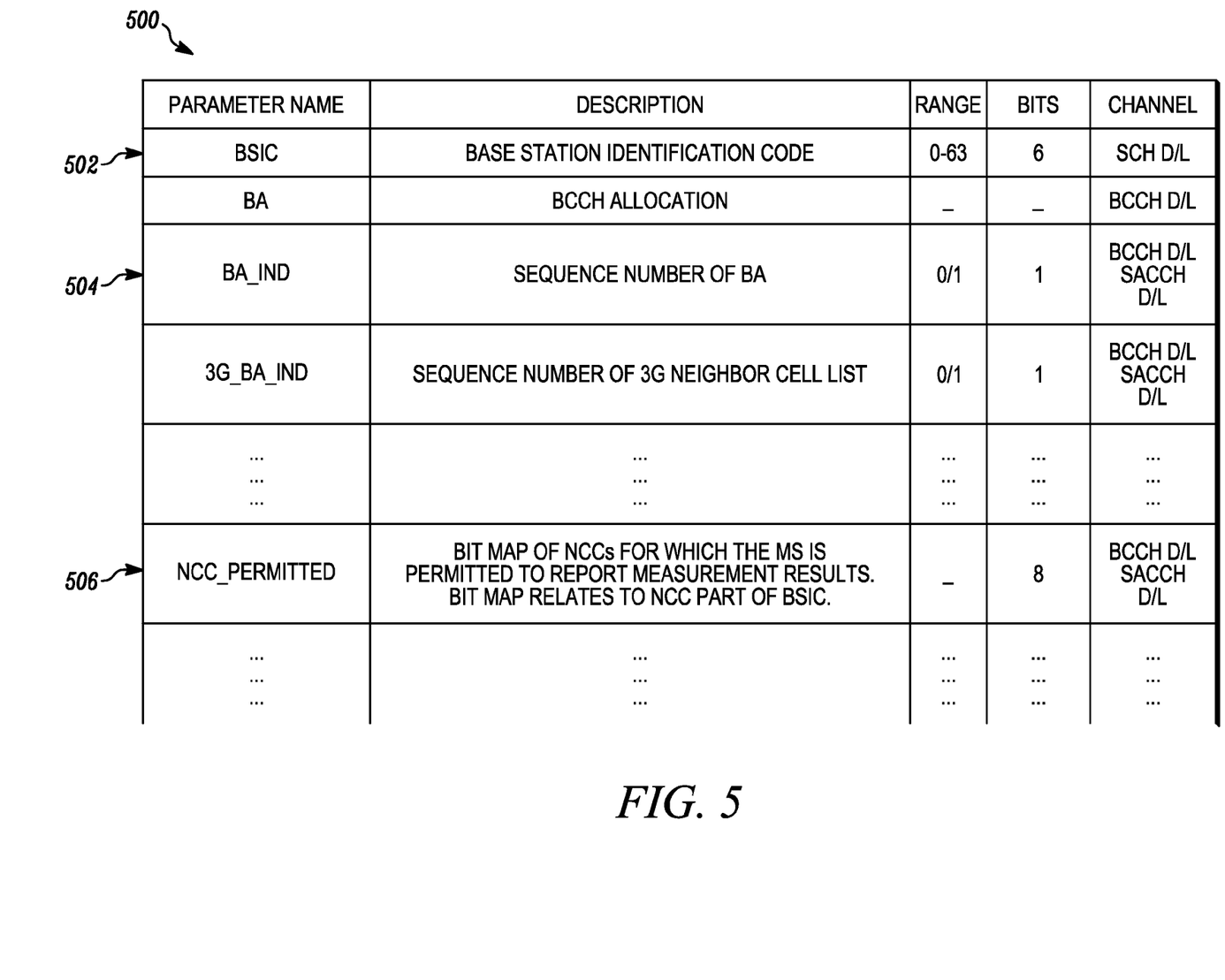
FIG. 5 is a table that provides descriptions of radio link control parameters used to provide measurement reports, according to one embodiment.

FIG. 5 is a table that provides a list of radio link control parameters used by a wireless device to report signal strength measurement results of neighbor cells, according to one embodiment. Table 500 comprises first (parameter) row 502, second row 504 and third row 506. First row 502 defines the base station identification code (BSIC) parameter for which the 6-bit values may range from 0 to 63. The BSIC parameter is transmitted on the uplink and downlink synchronization channels by MS/UE 102 and BTS/BSS 106, respectively. The BSIC parameter comprises a 3-bit network color code (NCC) part and a 3-bit basic station color code (BCC) part.

At a configured signaling period, Base Handover utility 120 transmits one or more information messages to a wireless device. In particular, Base Handover utility 120 transmits one or more of: (a) a System Information message Type 5 (SI5); (b) a System Information message Type 6 (SI6); and (c) other System Information messages. These SI messages comprise reporting/radio (link) control parameters that Base Handover utility 120 uses to instruct MS/UE 102 about the type of measurement reports to provide and/or what cells to report on. For example, Base Handover utility 120 provides the NCC_Permitted parameter (i.e., a first control parameter) within an SI6 message.

The NCC_Permitted parameter is also in SI2 which is broadcast on the BCCH. As described at third row 506, the NCC_Permitted parameter is a bit map of 8 bits which parameter identifies the national color codes (NCCs) for which MS/UE 102 is permitted to report measurement results. The bit map relates to the NCC part of the BSIC. Based on the fact that the NCC_Permitted parameter may not be a highly dynamic or frequently changing parameter from cell to cell (within the same location area), MS/UE 102 may report on a first neighbor cell for one or more measurement periods (when signaling is good) and/or until receipt of an updated NCC_Permitted parameter from a new SI6 message. This reporting pattern may occur if (a) the first neighbor cell was initially permitted via an NCC_Permitted parameter received via the previous serving cell and MS/UE 102 is already in synchronization with the first neighbor cell (via the previous serving cell), and (b) the first neighbor cell is no longer permitted as indicated via the updated NCC_Permitted parameter received via an SI6 message from the previous serving cell after handoff to a current serving cell. Synchronizing (i.e., "syncing") MS/UE 102 via the previous serving cell is required because syncing (via the current serving cell) to new cells received in the new BA list may take three (3) to five (5) seconds (i.e., an unacceptably long delay).

A second parameter is BAND_INDICATOR (or BA_IND) and is described in second row 504. Because the absolute radio frequency channel numbers (ARFCNs) from 512 to 8xx are used for both the PCS1900 band and the DCS1800 band, this second parameter (i.e., BAND_INDICATOR) is used to designate the relevant band. Originally the high band was derived from the low band (PCS1900 went with 850 (US pairing), and DCS1800 went with 900, (EURO Pairing)) but as GSM moved into other countries these pairings were not always correct and a bit was allocated to clarify the ambiguity. Similar to the NCC_PERMITTED argument, BAND_INDICATOR is often not dynamically changing from cell to cell.

When NCR utility 220 or MS/UE 102 provides a measurement report, MS 102 also provides a corresponding neighbor list that is rebuilt from the one or more information messages received by BTS 106. When the parameter information is received in more than one information message, NCR utility 220 or MS/UE 102 combines only information relating to the BA (list) from messages received on the same channel and indicating the same/common value of the BCCH allocation sequence number (BA_IND). As a result, MS/UE 102 rebuilds the BA (list), according to established procedures for rebuilding neighbour (cell) lists.

Figure 6:
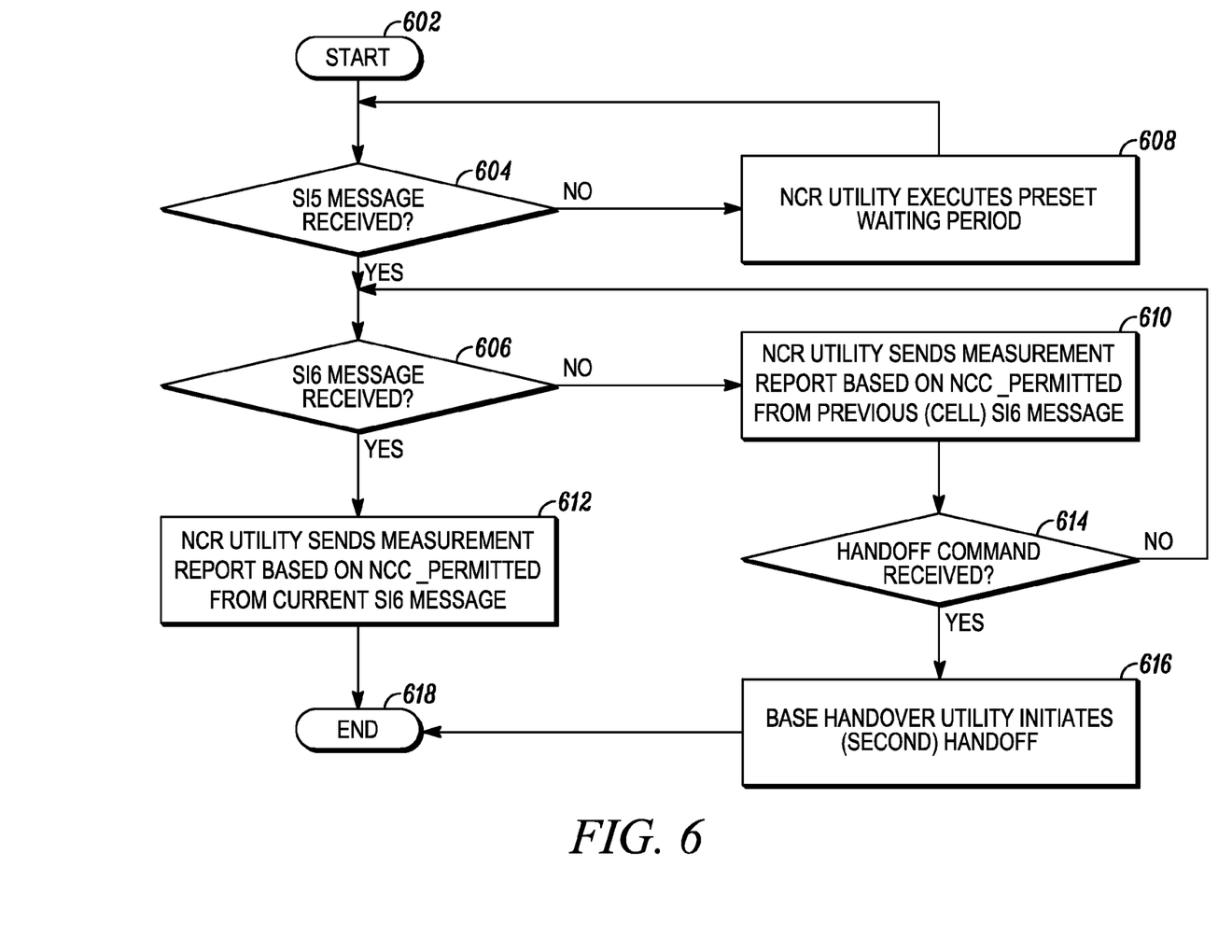
FIG. 6 is a flow chart which illustrates the process of efficiently reporting signal strength measurement results of neighbor cells, according to one embodiment.

FIG. 6 is a flow chart which illustrates the method/process by which an MS/UE 102 efficiently reports signal strength measurement results of neighbor cells, according to one embodiment. Although the method illustrated in FIG. 6 may be described with reference to components shown in FIGS. 1-5, it should be understood that this is merely for convenience and alternative components and/or configurations thereof can be employed when implementing the method. Key portions of the method may be completed by NCR utility 220 executing within MS/UE 102 controlling specific operations of/on MS/UE 102. The method is described from the perspective of either/both NCR utility 220 and MS/UE 102.

The process of reporting measurement results of neighbor cells begins at initiator block 602, when Base Handover utility 120 has completed a handoff of MS/UE 102 from a first cell to a second cell by utilizing a handoff command from BSS/eNodeB, according to one or more measurement reports. At decision block 604, NCR utility 220 determines whether the wireless device receives a first information message (e.g., an SI5 message) while within the second cell. If NCR utility 220 determines that the wireless device has not (yet) received the first information message, NCR utility 220 executes a preset waiting period, as shown at block 608. Following block 608, the process returns to decision block 604. However, if at block 604 NCR utility 220 determines that the wireless device has received the first information message, the process proceeds to decision block 606 at which NCR utility 220 determines whether the wireless device receives a second information message (e.g., an SI6 message) while within the second cell.

If at decision block 606 NCR utility 220 determines that the wireless device has received the second information message (e.g., the SI6 message), NCR utility 220 parses the second information message for the NCC_Permitted parameter and associated BA list received within the second information message, and NCC utility 220 sends a first type of measurement report to the BSS/eNodeB 106, as shown at block 612. In the provided embodiments, the first type measurement report is based on the SI5 message and the NCC_Permitted parameter and/or the associated BA list from the most current (SI6) message received. If at decision block 606, NCR utility 220 determines that the wireless device has not (yet) received (and/or fails to receive) the second information message, NCR utility 220 sends a second type of measurement report to the BSS/ENodeB 106. The second type measurement report is based on the SI5 message and the NCC_Permitted parameter from the previous SI6 message (since the current SI6 message has not yet been received), as shown at block 610. In the various embodiments, copies of the at least the last completely received information messages (SI5 and SI6) are maintained in local storage of the MS/UE 102 to enable the MS/UE 102 to utilize that data for future handoff operations, if needed. These stored information messages are updated as new messages of both types are received by the MS/UE 102.

In one embodiment, NCR utility 220 waits for receipt of the second information message only for a preset time period following receipt of the first information message (within the preset signaling period). Also, in one embodiment, the previous (i.e., most recently received) SI6 message can be the SI6 message received from the first cell prior to handoff of the MS/UE 102 to the second cell. In one embodiment, NCR utility 220 and/or MS/UE 102 creates the second type of measurement report by using the SI5 message and a BA list corresponding to one or more of: (a) an SI2 message; (b) a SI2bis message; and (c) another system information message.

Returning to the flow chart, at block 614, NCR utility 220 determines whether a second handoff command is received, according to the contents of the second type of measurement report that is provided to the eNodeB. In one embodiment, the second type of measurement report is a report that the MS/UE 102 generates and immediately transmits to the BSS/eNodeB 106, where the MS/UE 102 does not delay the transmission to wait for receipt of the second information message from the BSS/eNodeB. If at decision block 614, NCR utility 220 determines that the second handoff command is not received, the process returns to block 606. If at block 614, NCR utility 220 determines that the second handoff command has been received, NCR utility 220 responds to a request for a (second) handoff of MS/UE 102 by initiating procedures to enable handoff from the second cell (to a third cell or back to the first cell) to avoid experiencing a dropped call and/or poor service, as shown at block 616. The process ends at block 618.

In the flow chart above, certain processes of the methods are combined, performed simultaneously or in a different order, or perhaps omitted, without deviating from the spirit and scope of the invention. Thus, while the method processes are described and illustrated in a particular sequence, use of a specific sequence of processes is not meant to imply any limitations on the invention. Changes may be made with regards to the sequence of processes without departing from the spirit or scope of the present invention. Use of a particular sequence is therefore, not to be taken in a limiting sense, and the scope of the present invention extends to the appended claims and equivalents thereof.

The above described embodiments present a method performed within a mobile wireless device for reporting information about signal strength performance of neighbor cells within a wireless communication environment. The method comprises: receiving a current first type information message from a base station within a second cell following a handoff of communication occurring on the mobile wireless device from a first cell to the second cell; and in response to the current first type information message being received from the base station, automatically generating and transmitting a measurement report to the base station. When a second type information message is not received concurrently with the first type information message, the measurement report is generated utilizing a previously-received second type information message, without waiting on receipt of the current second type information message from the base station. The current first type information message is a system information type 5 (SI5) message and both the current second type information message and the previously-received second type information message are Sys6 (SI6) messages.

According to the described embodiments, the automatically generating process further comprises: determining whether the current second type information message is also currently received from the base station within the second cell; in response to concurrently receiving the current second type information message from the base station, generating a first type measurement report based on information received from the current first type information message and the received current second type information message; and in response to not receiving the current second type of information message: generating a second type measurement report based on the received current first type information message and the previously-received second type information message from one of the first cell and a previous cell. The generating of the second type measurement report occurs prior to successfully receiving the current second type information message, and the method further comprises transmitting the second type measurement report to the base station.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture (or computer program product) in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional base station/eNodeB with installed (or executed) software, those skilled in the art will appreciate that the software aspects of an illustrative embodiment of the present invention are capable of being distributed as a computer program product in a variety of forms, and that an illustrative embodiment of the present invention applies equally regardless of the particular type of media used to actually carry out the distribution. By way of example, a non exclusive list of types of media, includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. In a mobile wireless device, a method for reporting information about signal strength of neighbor cells within a wireless communication environment, said method comprising:
   receiving a current first type information message from a base station or eNB within a second cell following a handoff of communication occurring on the mobile wireless device from a first cell to the second cell;
   determining whether a current second type information message is received from the base station or eNB; and
   in response to the current first type information message being received from the base station or eNB and said determining of whether a current second type information message is received, generating and transmitting a measurement report to the base station or eNB;
   wherein, the measurement report is a first type measurement report if is determined that a current second type information is received, and is a second type measurement report if it is determined that a current second type information message is not received, the first type measurement report being based on information received from the current first type information message and the received current second type information message, and the second type measurement report being based on information received from the current first type information message and a previously-received second type information message.

2. The method of claim 1, wherein said determining further comprises:
   tracking an elapsed time from a receipt of the current first type information signal without receiving a current second type information message;
   determining that the elapsed time exceeds a preset signaling period; and
   determining that a current second type information message is not received based on said determining that the elapsed time exceeds the preset signaling period.

3. The method of claim 1, further comprising:
   receiving via the current first type information message a first neighbor list or a broadcast control channel (BCCH) Allocation (BA) list; and
   forwarding to the base station or eNB, at a preset reporting period, the measurement report of signal strength measurement results for neighboring cells identified by the current first type information message and either a previously-received second type information message or a currently-received second type information message.

4. The method of claim 3, wherein said receiving via the current first type information includes receiving the first neighbor list and the method further comprises:
- in response to determining that a current second type information message is not received, automatically generating a second neighbor list utilizing the first neighbor list and information retrieved from the previously-received second type information message; or
- in response to receiving the current second type information message, automatically generating the second neighbor list utilizing the first neighbor list and another neighbor list received within the current second type information message.

5. The method of claim 1, wherein:
- said second measurement report is provided in response to a failure of said wireless device to receive the current second information message at a preset interval following a corresponding signaling period; and
- the preset interval expires upon receipt of the current first information message or expiration of a threshold waiting period relative to receipt of the current first information message.

6. The method of claim 1, wherein the first type and second type information messages include a measurement information message; a system information message; or an extended measurement information message.

7. The method of claim 1, further comprising:
- receiving the first type information message and the second type information message via slow associated control channels (SACCH);
- creating the second type measurement report using a current neighbor list or a broadcast control channel (BCCH) Allocation (BA) list from the current first type information message and one or more parameters from a previously-received second type information message, wherein the one or more parameters include a network color code (NCC) NCC_Permitted parameter or a BA sequence number (BA_IND) parameter; and
- transmitting the second type measurement report via a slow associated control channel (SACCH).

8. The method of claim 1, wherein the current first type information message is a Sys5 (SI5) message and both the current second type information message and the previously-received second type information message are Sys6 (SI6) messages.

9. A wireless device comprising:
- a processor;
- a memory device coupled to the processor and having instructions that, when executed on the processor, causes the wireless device to:
- receive a current first type information message from a base station or eNB within a second cell following a handoff of communication occurring on the mobile wireless device from a first cell to the second cell;
- determine whether a current second type information message is received;
- in response to the current first type information message being received from the base station or eNB and said determining of whether a current second type information message is received, generating and transmitting a measurement report to the base station or eNB;
- wherein, the measurement report is a first type measurement report if is determined that a current second type information is received, and is a second type measurement report if it is determined that a current second type information message is not received, the first type measurement report is based on information received from the current first type information message and the received current second type information message, and the second type measurement report is based on information received from the current first type information message and a previously-received second type information message.

10. The wireless device of claim 9, wherein the instructions, when executed, further causes the wireless device to:
- track an elapsed time from one of: an entry of the wireless mobile device into the second cell; a receipt of the current first type information signal; a previous receipt of a previous second type information signal; and in response to the elapsed time exceeding a pre-established maximum time during which the current second type information signal is expected to be received before an ongoing communication is dropped by the wireless mobile device, triggering the generating and transmitting of the second type measurement report; wherein the elapsed time exceeding the pre-established maximum time indicates that the wireless device has failed to decode the received data which contained the current second type information message.

11. The wireless device of claim 10, wherein the instructions, when executed, further causes the wireless device to:
- receive via the current first type information message a first neighbor list or a broadcast control channel (BCCH) Allocation (BA) list; and
- forward to the base station or eNB, at a preset reporting period, the measurement report of signal strength measurement results for neighboring cells identified by the current first type information message and either a previously-received second type information message or a currently-received second type information message.

12. The wireless device of claim 11, wherein the instructions, when executed, further causes the wireless device to:
- in response to detecting that the current second type information message is not received, automatically generate a second neighbor list utilizing the first neighbor list and information retrieved from the previously-received second type information message; and
- in response to receiving the current second type information message, automatically generate the second neighbor list utilizing the first neighbor list and another neighbor list received within the current second type information message.

13. The wireless device of claim 9, wherein: said second measurement report is provided in response to a failure of said wireless device to receive the current second information message at a preset interval following a corresponding signaling period; and the preset interval expires upon receipt of the current first information message or expiration of a threshold waiting period relative to receipt of the current first information message.

14. The wireless device of claim 9, wherein the first type and second type information messages include a measurement information message; a system information message; or an extended measurement information message.

15. The wireless device of claim 9, wherein the instructions, when executed, further cause the wireless device to:
- receive the first type information message and the second type information message via slow associated control channels (SACCH);
- create the second type measurement report using a current neighbor list or a broadcast control channel (BCCH) Allocation (BA) list from the current first type information message and one or more parameters from a previously received second type information message, wherein the one or more parameters include a network color code (NCC) NCC_Permitted parameter from a previously-received second type information message or a BA sequence number (BA_IND) parameter; and transmit the second type measurement report via slow associated control channel (SACCH).

16. The wireless device of claim 9, wherein the current first type information message is a Sys5 (SI5) message and both the current second type information message and the previously-received second type information message are Sys6 (SI6) messages.

* * * * *